March 5, 1963

I. H. CULVER ETAL 3,080,001

HELICOPTER

Filed Oct. 7, 1959

INVENTORS
IRVEN H. CULVER
DONALD E. WALTERS

BY

*George C. Sullivan*

Agent

March 5, 1963     I. H. CULVER ETAL     3,080,001
HELICOPTER
Filed Oct. 7, 1959     3 Sheets-Sheet 2
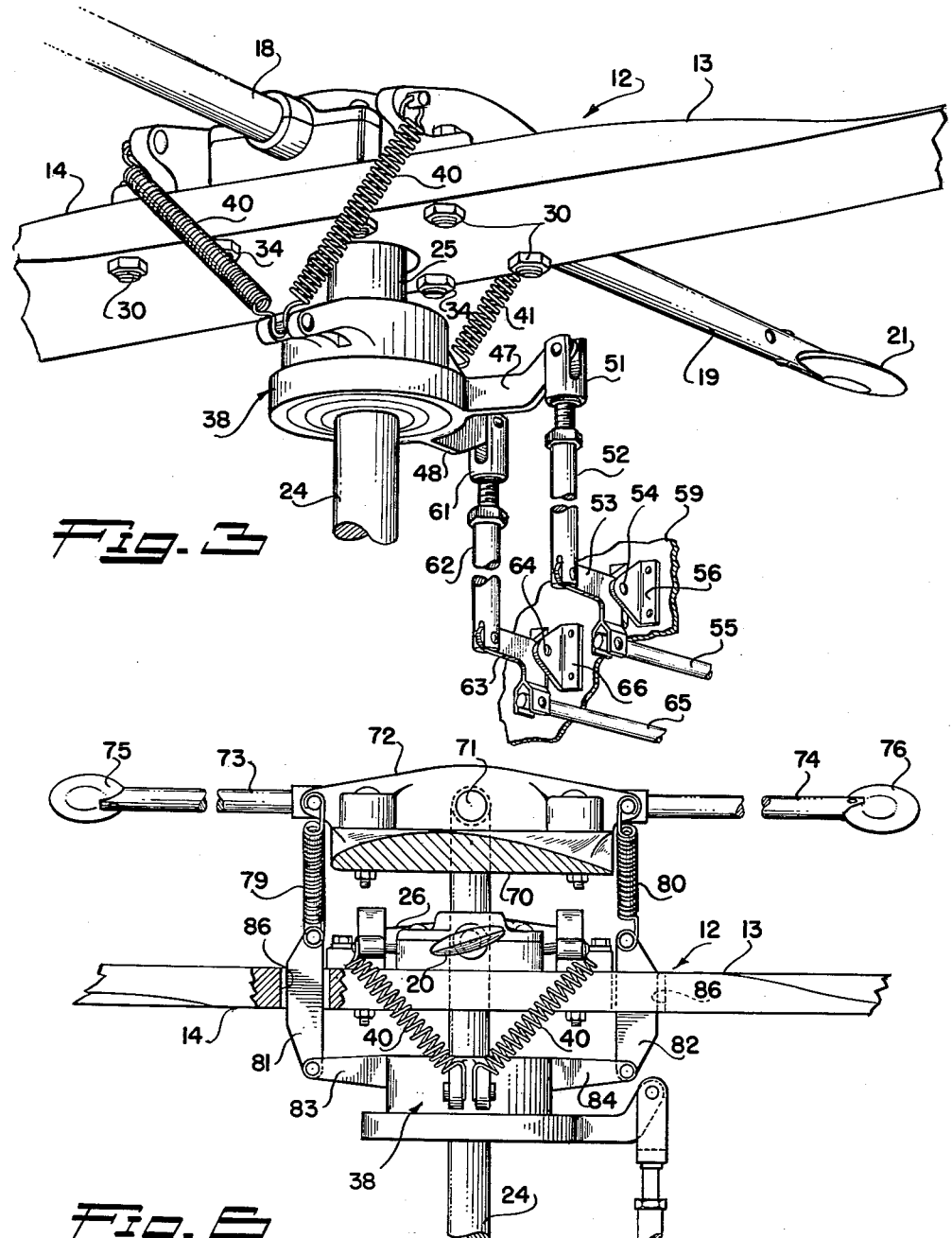
INVENTORS
IRVEN H. CULVER
DONALD E. WALTERS
BY *George C. Sullivan*
Agent

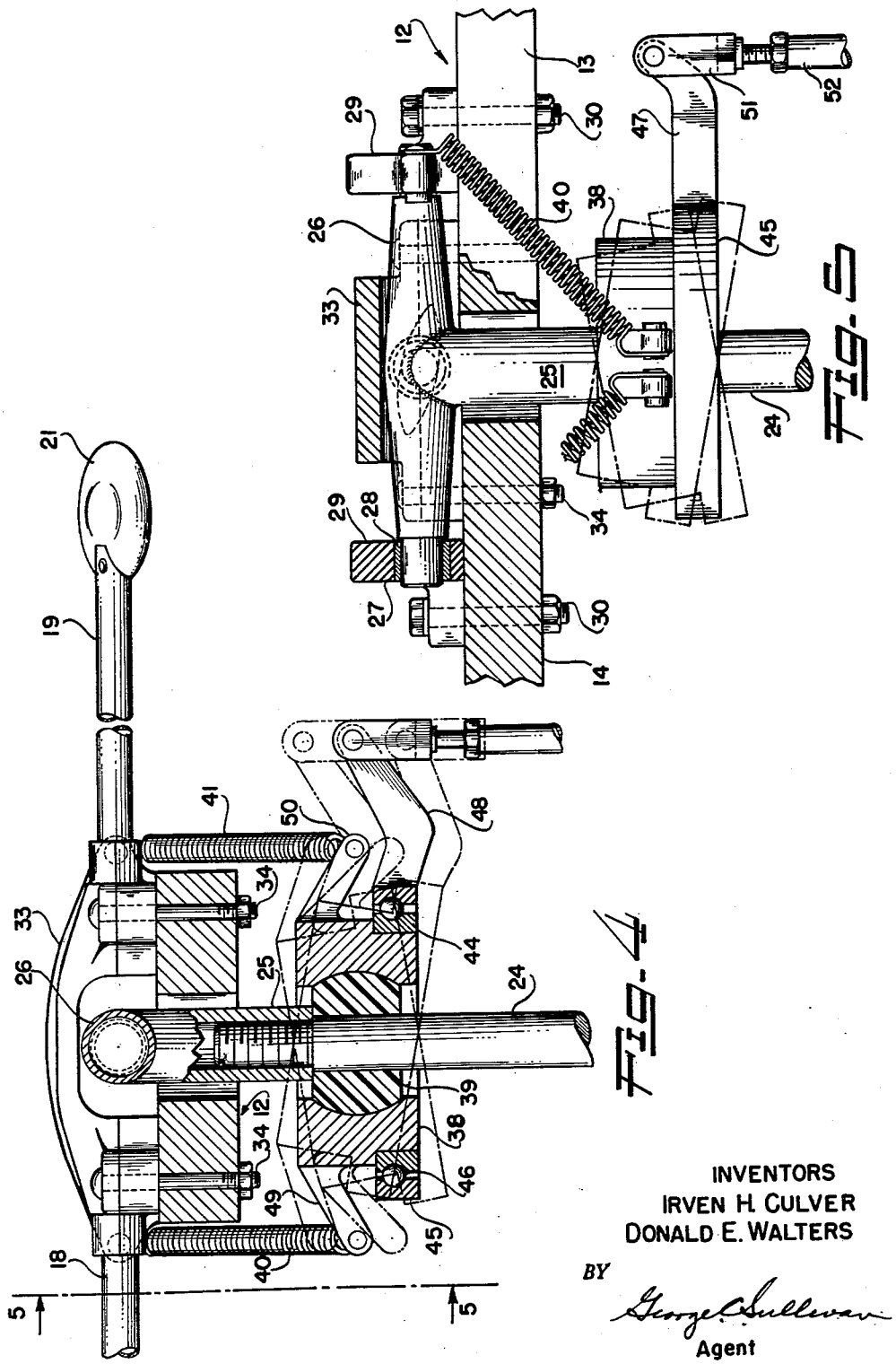

3,080,001
Patented Mar. 5, 1963

3,080,001
HELICOPTER
Irven H. Culver, Burbank, and Donald E. Walters, Calabasas, Calif., assignors to Lockheed Aircraft Corporation, Burbank, Calif.
Filed Oct. 7, 1959, Ser. No. 844,886
12 Claims. (Cl. 170—160.13)

This invention relates to a rotary wing aircraft or helicopter which uses a rotor to provide the necessary lift to sustain flight. More particularly, it relates to an improved main rotor system for such an aircraft.

Helicopters generally have been known to be inherently unstable. A highly skilled pilot has been required to fly most helicopters which have been previously developed. There have been many efforts toward stabilizing the helicopter type aircraft but these have resulted in complex systems which include various combinations of flapping blades and variable pitch rotors. With increased complexity comes an additional requirement of skill on the part of the pilot as well as compounded maintenance problems.

It is thus an important object of this invention to provide a helicopter designed for people rather than pilots. It is intended that the helicopter, according to the present invention, be easily mastered by the average person without extensive training. The invention is intended to be used as a family vehicle much in the same way that an automobile would be used, for short errands or long trips.

It is thus another important object of the present invention to provide a helicopter which has basic earth sensing tendencies so that it will fly "hands off." This is accomplished by providing a main rotor which is slaved to a cross arm gyro to sense a level position. The cross arm gyro has a reasonable mass and is provided with aerodynamic surfaces which give pitch and roll correction to the sense of level.

It is another important object of the present invention to provide a helicopter having a high degree of stiffness about at least two of its three axes. The aircraft herein disclosed will require a conscious effort to be moved from its stable position.

It is an additional object of the present invention to provide an aircraft design which permits inexpensive construction resulting in low first cost and low maintenance costs so that it will be within reach of the average person or family. The components are few and simple and do not require the high degree of accuracy mandatory in helicopter parts to date.

It is another important object to provide an aircraft which is simple to control so that extensive training is not necessary to learn its operation. It is intended that it be guided rather then flown so that the operator may draw upon those experiences from everyday life as a background or basis of guiding the aircraft rather than having to learn an entirely new concept.

It is another important object to provide a helicopter which will be fail safe as far as auto rotation is concerned. This is achieved by using a rotor having fixed pitch. The inexperienced pilot or driver thus cannot override the auto rotation capability of the fixed pitch rotor.

Further objects and advantages of the present invention will become apparent especially when the following detailed description is read in conjunction with the detailed figures wherein like numbers designate like elements.

FIG. 3 is a perspective of the rotor control mechanism.

FIG. 4 is another view of the rotor control mechanism shown in greater detail.

FIG. 5 is a section taken on lines 5—5 of FIG. 4.

FIG. 6 shows a four bladed system which utilizes the teachings of the present invention.

The helicopter according to the present invention contemplates the use of a rotor including one or more sets of opposed blades. To each blade is rigidly attached a relatively short cross arm having a mass on the end which is tailored aerodynamically to provide stick-free pitch control of the rotor. Each blade of a set has a pitch fixed with respect to the other blade of the set. The main rotor and therefore the entire machine is slaved to the cross arm gyro by virtue of the attachment of the cross arm to the rotor blades. This construction allows the body of the machine to be supported angularly in pitch and roll by the gyroscopic and aerodynamic forces on the main rotor, thus providing attitude stiffness to the machine.

In the state of hover, a helicopter rotor will produce equal lift from each of its blades. However, in forward flight it can be seen that the forwardly moving blade, because of the increased velocity of the relatively moving air, will produce a greater lift than the aft moving blade. This greater lift will tend to lift that blade and tend to drop the other blade, thereby decreasing its lift. Therefore, some means must be provided to equalize lift during forward flight. This is accomplished through use of the cross arm gyro system.

Figure 1:
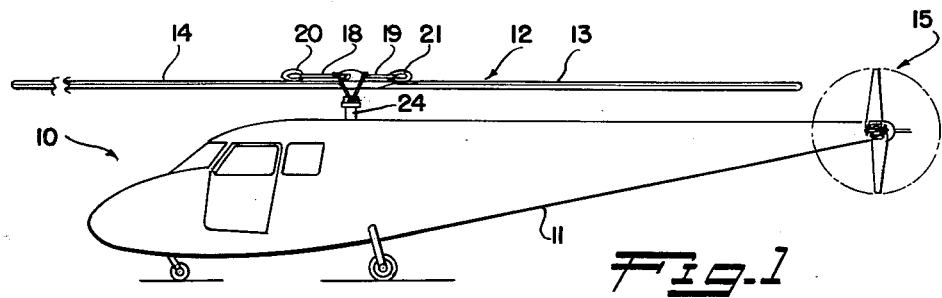
FIG. 1 is a side view of the helicopter according to the present invention which utilizes a non-articulated, aeroelastic rotor.
Figure 2:
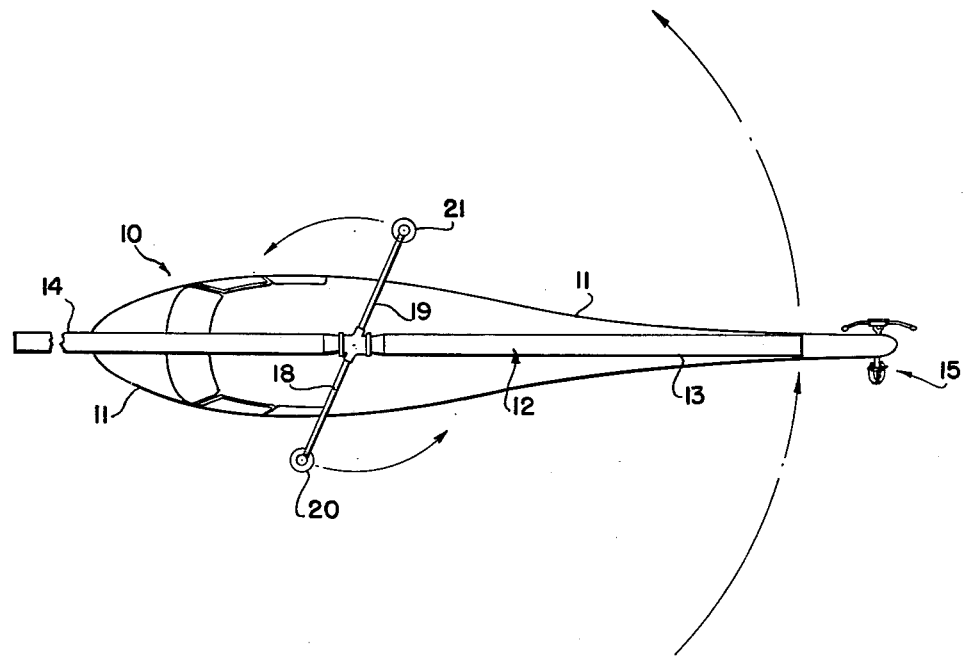
FIG. 2 is a plan view of the helicopter of FIG. 1 showing in more detail the features important to the present invention.

The helicopter 10 of FIGS. 1 and 2 is shown with a fuselage 11, a non-articulated main rotor 12 having two blades 13 and 14 fixed with respect to each other and a tail rotor 15 to provide directional or yaw control. Fixed to the center of the rotor 12 are transversely extending arms 18 and 19 on the ends of which are masses 20 and 21. As can be seen from FIGS. 1, 3, 4 and 5, the masses 20 and 21 have a positive pitch as does the main rotor blade which it follows.

The driving force for the rotor 12 is transmitted through the vertical drive shaft 24. On the upper extremity of the vertical drive shaft 24 is a sleeve 25 on which is fixed a relatively short cross shaft 26. On the extremities of the cross shaft 26 are journals 27 on which bearings 28 oscillate. Note that the rotor 12 is in axial alignment with the cross shaft 26. Thus, any "see-saw" movement about the transverse axis of the rotor 12 is prevented while there is permitted an oscillatory motion about the cross shaft 26 or substantially about the longitudinal axis of rotor 12. The brackets 29 in which bearings 28 are set are fixed to the rotor 12 by the bolts 30. The arms 18 and 19 are fixed to bracket 33 which is fastened by bolts 34 to the rotor 12.

Control inputs to vary the oscillatory position of the rotor 12 about the axis defined by the cross shaft 26 are transmitted through swash plate 38 which rotates with the rotor 12 on the journal 39. The journal 39 permits movement of the swash plate 38 universally in any plane subject to the restrictions of shaft 24 so that varying control forces may be transmitted to the rotor. These forces are transmitted through springs 40 and 41 to opposite sides of the rotor 12. The swash plate 38 is equipped with an inner bearing race 44 which rotates freely within the outer race 45 on ball bearings 46. Integral with the outer race 45 are two control levers 47 and 48. The control lever 47 moves the race 45 and swash plate 38 about a longitudinal axis with respect to the main body of helicopter 10 and the control arm or lever 48 alters the swash plate 38 about an axis transverse to the body of the helicopter 10. Forces to move the control element 47 are transmitted through the clevis 51, the arm 52, bell crank 53, about the pivot 54 and the shaft 55. Pivot 54 is mounted on brackets 56 attached to the main body structure 57. The control lever 48 is also moved through clevis 61, shaft 62, bell crank 63, pivot 64, shaft 65 and the bracket 66. Shafts 55 and 65 are attached to a control stick or wheel column in the cockpit of the helicopter not shown here.

Since a helicopter rotor responds sometime later in its circle of rotation to a control input, usually about 90 degrees, movement of the swash plate 38 about the longitudinal axis of the helicopter through movement of arm 47 and its associated linkages control pitch. Likewise arm 48 and its associated linkage controls roll.

By using dual springs 40 and 41 to transmit control forces to the rotor 12, it has been discovered that even though a spring may break, the control system is still effective. Thus, the present invention is practically fail safe. The frequently disastrous results of part failure characteristic of most prior rotary wing type aircraft is thus avoided.

FIGS. 1 and 2 show the main rotor 12 and its transverse arms 18 and 19 rigidly fixed thereto rotating in a counterclock-wise direction as viewed from above. As the helicopter moves forward, the forwardly moving blade on the right side of the helicopter 10 will be moving at a greater relative air speed than the moving aft on the left side of the helicopter 10. The forwardly moving blade will, therefore, create a greater lift than the left aft moving blade. This will obviously create an unbalance of lift forces which must be compensated for by some means of cyclically changing the angle of attack or pitch so that the lift about the rotor disk is equal.

The cyclic pitch control is effected through the masses 20 and 21 rotating on the ends of arms 18 and 19 which are fixed to bracket 33 on rotor 12. For purposes of the discussion at this time, the masses 20 and 21 will be treated as if they had no pitch. The purpose of their pitch will be later described.

The masses in rotation provide a reference plane to which the rotor 12 will be slaved. The rotor 12 will attempt to follow the masses 20—21 to establish the direction and speed of the helicopter. For instance, if the plane of rotation of the masses 20 and 21 is tilted forward, the helicopter will move forward. Its speed will be dependent on how much tilt is put in. Since reaction to control inputs to the swash plate 38 will occur about 90 degrees, later in the rotational circle, in order to obtain a forward tilt on the mass rotational plane, the swash plate will be tilted to the right in the case of a counterclock-wise rotating rotor as is shown and described here.

Forward tilt of the plane of rotation of masses 20 and 21 will cause the retreating rotor blade in the left sector to increase its angle of attack of pitch resulting in a greater lift and the forwardly moving blade to decrease its pitch angle resulting in less lift. This is because of the freedom of rotation about the longitudinal axis of the rotor blade as previously described.

Because the reaction to input forces which are perpendicular to the plane of rotation of a mass in angular motion occurs at a point approximately 90 degrees later in that orbit, a decrease in the pitch of the forwardly moving blade at about a right angle to the direction of movement will be felt when the rotor reaches the fore and aft position in its orbit or when the affected blade is pointing straight ahead and the aft moving blade when it is straight aft. Since the plane of rotation of masses has caused a greater lift on the aft moving blade and less on the forward blade, there will be a pitch down effect. The rotor and the vertical drive shaft 24 being fixed in their relationship between the axis of the shaft and the longitudinal axis of the rotor, the down tilt of the forward blade and the up tilt of the aft blade will tilt the drive shaft 24 forward. This will cause forward tilt resulting in a forward force vector to cause forward movement of the aircraft. Several revolutions are required before the desired tilt is attained. It is approached in small increments.

The action of the elements of the device necessary for forward flight have been described in detail. Movements in other directions will be substantially the same with similar orientation of the plane of rotation of masses 20 and 21 and the other related elements.

To this point, the masses 20 and 21 have been handled as if they had no positive pitch. However, it will be seen that, if such were truly the case, when the helicopter assumed the forward tilt resulting from an input resulting in right tilt of the swash plate 38, the swash plate will tilt forwardly with the helicopter resulting in an even further tilt of the rotor with respect to level. The plane of the rotation of the masses following the swash plate will take on an even greater tilt with respect to level. It can be seen that tilt of the helicopter will aggravate the tilt of the plane of rotation of the masses and vice versa resulting in a combination tight spiral and inside loop and disaster.

It is for this reason that the masses 20 and 21 have been given a positive pitch. It can be seen that in forward movement, the speed of the relatively moving air is greater in the right sector of movement than in the left sector with counterclock-wise rotating rotor blades. Thus, an aerodynamic surface having positive pitch will create a greater lift in the right sector. Again considering the 90 degree lag in reaction to force inputs to a rotating body or mass, there will be a tendency for the masses to pitch up when the helicopter is moving forward, the lift in the right sector of movement being felt when the forward position is reached. This pitch up is aided by decreased lift on the retreating mass dropping it which helps lift the forward mass. The roll forces which created this precession rate are in the same plane as the control input and tend to cancel out the control input forces. The control forces from the control stick through swash plate 38, springs 40 and 41 tend therefore to be cancelled out by the forces generated by the aerodynamic surfaces of mass 20—21. The net difference between the control forces from the stick and the aerodynamic forces from the masses 20 and 21 will result in the precession of those masses in such a direction so that there is a resultant balance in the two forces. Thus the aircraft would have the safety factor of returning to level flight if in case of an emergency, the pilot released all pressures upon the stick.

It will be noted that in a state of hover, there will be an equal lift on both masses 20 and 21 as well as blades 13 and 14 since there is no difference in relative motion with the air between the forwardly moving surfaces and the aft moving surfaces. Only when there is horizontal motion between the aircraft and the surrounding air is there an aerodynamic precession reaction by the masses 20 and 21.

In FIGS. 3, 4 and 5, the arms 18 and 19 are shown at a right angle to the main rotor blade 12 to simplify the explanation of the basic principle behind the present invention. However, it has been discovered that the optimum position of the masses 20 and 21 in relation to the rotor blades which they follow for all conditions of flight falls between 95 and 135 degrees behind the trailing edge of the particular blade which they follow, as shown in FIGS. 1 and 2. The exact relationship within this range depends on the elasticity and angular velocity of the rotor.

It will, of course, be seen that placing the cross arms 18 and 19 behind the 90 degree position with respect to the rotor blades, a like angular change forward of the 90 degree position must be applied to the swash plate input.

By the use of springs 40 and 41 in the control system, such that a control setting applies to a precessional force 90 degrees out of phase with the desired response, the effects of body motion and lost motion in the control system are minimized. The method of applying the control through springs that require considerable deflection to generate the precessional forces accomplishes the desired effect of body motions not affecting the control plane appreciably. Also this leads to insensitivity to lost motion in the control system since lost motions are small relative to the large control deflections.

The foregoing description has involved the use of a single rotor 12 for purposes of simplicity of explanation. It will be seen that by using two rotors mounted at right angles to each other, such as is shown in FIG. 6, there will be a lesser vibration. The masses at the end of the transversely extending arms will operate in the same manner as in the case of a single rotor. FIG. 6 shows an extension of the vertical shaft 24 to accommodate a rotor 70 mounted above rotor 12. The shaft 24 thus has two short cross shafts 26 and 71; cross shaft 71 permits oscillation of the rotor 70 substantially about its longitudinal axis. Bolted to the rotor 70 is a bracket 72 to which the cross arms 73 and 74 are fixed with their respective masses 75 and 76 on their ends. Cyclic pitch control is affected much in the same manner as with the rotor 12. The rotor 70 is oscillated about its longitudinal axis by means of springs 79 and 80 which are attached to opposite sides of the rotor 70. Springs 79 and 80 are in turn attached to links 81 and 82 which are pivoted to arms 83 and 84 fixed to swash plate 38. Openings 86 are provided through rotor 12 to allow free movement of links 81, 82.

The use of a non-articulated relatively rigid rotor provides a gyroscopic quality to its rotation aiding in stiffness about the roll and pitch axes. It also precludes the danger of overriding of auto rotation tendencies by the inexperienced driver or pilot in event of power failure. There is no possibility of stalling out the motor blades during auto rotation, an extreme danger with prior helicopters.

A helicopter rotor has been disclosed which is simple in its construction and safe to operate. It permits the initial expense as well as operating and maintenance costs to be low. Because of its high stiffness about its roll and pitch axis and its high degree of earth or level sensing, it is easy to learn to operate to bring it within the capabilities of the average person.

It is to be understood that certain alterations, modifications and substitutions may be made to the instant disclosure without departing from the spirit and scope of the invention as defined in the appended claims.

Having revealed the details of my invention, I claim the following combinations of elements and their equivalents.

1. A helicopter including a rotary wing rotatable in a substantially horizontal plane to provide lift comprised of: a rotor having one or more sets of opposed blades fixed with respect to each other, means to prevent movement of each set of said opposed blades about its transverse axis, means to oscillate said set of blades about its longitudinal axis, relatively short arms fixed rigidly to each set of said rotor blades and extending transversely thereto substantially in its plane of rotation, aerodynamic surfaces on the extreme ends of said arms having a positive pitch in the direction of rotation of said rotor and means to rotate said rotor.

2. A helicopter including a rotor having one or more sets of opposed blades fixed with respect to each other, means to prevent movement of each set of said opposed blades about its transverse axis, means to oscillate said set of blades about its longitudinal axis, relatively short arms fixed to each set of said rotor blades and extending transversely thereto substantially in its plane of rotation, aerodynamic surfaces on the extreme ends of said arms having a positive pitch in the direction of rotation of said rotor and lying along a line on either side of said rotor 95 to 135 degrees aft of the trailing edge of each blade of said rotor.

3. A helicopter including a rotary wing comprised of: an elongated main body, a vertical shaft extending above said main body, means within said body to rotate said vertical shaft, a cross shaft fixed at its center to the upper extremity of said vertical shaft, said cross shaft having journals on its ends, a relatively rigid rotor having opposed blades fixed with respect to each other, an opening in said rotor extending from its under side to its upper side of a diameter slightly larger than said vertical shaft, said opening fitting around said vertical shaft under said cross shaft, bearings fixed to the upper side of said rotor blade at such a distance from its center so as to mate with said journals so as to permit oscillation of said rotor about the axis of said cross shaft, transversely extending arms fixed to said rotor blade at its center having a mass concentrated at the extremity of said arms, said mass being shaped to provide an aerodynamic surface having a positive pitch in the direction of rotation of said rotor blade, said vertical shaft having an enlarged spherically shaped journal below said rotor, a swash plate having a central bearing complementary in shape to said spherically shaped journal and mounted thereon for universal movement, means to move said swash plate about an axis transverse to said main body and means to move said swash plate about an axis longitudinal to said main body, resilient means attached to opposite sides of said swash plate 90 degrees from said cross shaft, said resilient means being also attached to opposite sides of said rotor blade also at points 90 degrees to said shaft cross arm.

4. A helicopter including a rotary wing comprised of: an elongated main body, a vertical shaft extending above said main body, means within said body to rotate said vertical shaft, a short cross shaft fixed at its center to the upper extremity of said vertical shaft, said cross shaft having journals on its extremities, a relatively rigid rotor having opposed blades fixed with respect to each other, bearings mounted on said rotor along its longitudinal axis to mate with said journals on said cross shaft so as to permit oscillation of said rotor about the axis defined by said cross shaft, transversely extending arms fixed to said rotor blade having a mass concentrated at the extremity of said arms, said mass being shaped to provide an aerodynamic surface having a pitch in the same direction as the pitch of said rotor blade, said vertical shaft having an enlarged spherically shaped journal below said rotor, a swash plate having a central bearing complementary in shape to said spherically shaped journal and mounted thereon for universal movement, means to move said swash plate about an axis transverse to said main body and means to move said swash plate about an axis longitudinally to said main body, resilient means attached to opposite sides of said swash plate 90 degrees from said cross shaft, said resilient means also attached to opposite sides of said rotor blades at points 90 degrees to said shaft cross arm so that control inputs may alter the position of said swash plate which in turn will alter the position of said rotor through a resilient means.

5. A helicopter including a rotary ring comprised of an elongated main body, a vertical shaft extending above said main body, means within said body to rotate said vertical shaft, a short cross shaft fixed at its center to the upper extremity of said vertical shaft, said cross shaft having journals on its extremities, a relatively rigid rotor having opposed blades fixed with respect to each other, bearings mounted on said rotor along its longitudinal axis equidistant from its center to mate with said journals on said cross shaft so as to permit oscillation of said rotor about the axis defined by said cross shaft, transversely extending arms fixed to said rotor blade having a mass concentrated at the extremity of said arms, said mass being shaped to provide an aerodynamic surface having a pitch in the same direction as the pitch of said rotor blade, said mass also lying along a line between 95 and 135 degrees aft of the trailing edge of each rotor blade, said vertical shaft having an enlarged spherically shaped journal below said rotor, a swash plate having a central bearing complementary in shape to said spherically shaped journal and mounted thereon for universal movement, means to move said swash plate about an axis transverse to said main body and means to move said swash plate about an axis longitudinal to said main body, resilient means attached to opposite sides of said swash plate 90 degrees from said cross shaft about the axis of rotation of said vertical shaft, said resilient means also attached to opposite sides of said rotor blades at points 90 degrees to said shaft cross arm so that control inputs may alter the position of said swash plate which in turn will alter the position of said rotor through resilient means.

6. A helicopter including a rotor having one or more sets of opposed blades fixed with respect to each other, means to prevent movement of each of said sets of opposed blades about its transverse axis, means to oscillate each set of opposed blades about its longitudinal axis, means fixed to each rotor blade transversely thereto and rigidly therewith to comprise a control gyro.

7. A helicopter including a rotary wing rotatable in a substantially horizontal plane to provide a lift said wing comprised of a rotor having one or more sets of opposed blades fixed with respect to each other, means to prevent movement of each set of said opposed blades about its transverse axis, means to oscillate said set of blades about its longitudinal axis, relatively short arms fixed to each set of rotor blades and extending transversely thereto substantially in its plane of rotation and positive pitch aerodynamic surfaces on the arms.

8. A helicopter including a rotor having one or more sets of opposed blades fixed with respect to each other, means to prevent movement of each set of said opposed blades about its transverse axis, means to oscillate each said set of blades about its longitudinal axis, relatively short arms fixed transversely and rigidly to each said set of blades substantially in its plane of rotation at an angle behind the trailing edge of each rotor blade of more than 90 degrees and aerodynamic surfaces having positive pitch on said arms.

9. A helicopter including a rotary wing comprised of a main body, a vertical drive-shaft extending above the main body, a cross-shaft fixed at its center to the upper extremity of said vertical shaft, said cross-shaft having journals on its ends, a relatively rigid rotor having opposed blades fixed with respect to each other, bearings fixed to said rotor along its axis at such a distance from its center so as to mate with said journals so as to permit an oscillation of said rotor about the axis of said cross-shaft, transversely extending arms fixed rigidly to said rotor, said transversely extending arms having a positive pitch in the direction of rotation of said rotor.

10. A helicopter including a rotary wing comprised of a main body, a vertical shaft extending above said main body, a relatively short cross-shaft fixed at its center at right angles to the upper extremity of the vertical shaft, said cross-shaft having journals at its extremities, a relatively rigid rotor having opposed blades fixed with respect to each other, bearings mounted on said rotor along its longitudinal axis to mate with said journals on said cross-shaft so as to permit oscillation of said rotor about the axis defined by said cross-shaft, transversely extending arms rigidly fixed to said rotor at an angle of more than 90 degrees behind the trailing edge of each rotor blade, each transversely extending arm having a positive pitch in the direction of rotation of the rotor.

11. A helicopter including a rotary wing comprised of a main body, a vertical shaft extending above said main body, means within the body to rotate said vertical shaft, a cross-shaft fixed at its center to the upper extremity of said vertical shaft, said cross-shaft having journals on its ends, a relatively rigid rotor having opposed blades fixed with respect to each other, bearings fixed to said rotor equidistant from its center so as to mate with said journals so as to permit oscillation of said rotors about the axis of said cross-shaft, transversely extending arms rigidly fixed to said rotor blade at its center, said cross-arms having areas of positive pitch in the direction of rotation of said rotor, a swash-plate, means to rotate said swash-plate with the vertical shaft, means to permit said swash-plate to move universally, control means to move said swash-plate about an axis transverse to said main body, control means to move said swash-plate about an axis longitudinal to said main body, means between said swash-plate and said cross-arms to transmit movements of said swash-plate to said cross-arms.

12. A helicopter including a rotary wing comprised of an elongated main body, a vertical shaft extending above said main body, means within said body to rotate said vertical shaft, a short cross-shaft fixed at its center to the upper extremity of said vertical shaft, said cross-shaft having journals on its extremities, a relatively rigid rotor having opposed blades fixed with respect to each other, bearings mounted on said rotor along its longitudinal axis equidistant from its center to mate with said journals on said cross-shaft so as to permit oscillation of said rotor about the axis defined by said cross-shaft, transversely extending arms rigidly fixed to said rotor blade substantially in the rotor blade's plane of rotation, parts of the transversely extending arms having aerodynamic surfaces of positive pitch in the direction of rotation of said rotor, said transversely extending arms lying aft of 90 degrees of the trailing edge of each rotor blade, a swash-plate below said rotor, means to rotate said swash-plate with said vertical shaft, means to universally mount said swash-plate around said vertical shaft, resilient means between said swash-plate and said transversely extending arms so that said transversely extending arms will follow inclinations of said swash-plate and control means to move said swash-plate.

References Cited in the file of this patent
UNITED STATES PATENTS

| | | |
|---|---|---|
| 2,384,516 | Young | Sept. 11, 1945 |
| 2,481,750 | Hiller | Sept. 13, 1949 |
| 2,735,500 | Perry | Feb. 21, 1956 |
| 2,861,641 | Benson | Nov. 25, 1958 |
| 2,879,956 | Brand | Mar. 31, 1959 |